US008155961B2

(12) United States Patent
Tian (10) Patent No.: US 8,155,961 B2
(45) Date of Patent: Apr. 10, 2012

(54) ADAPTATION OF AUTOMATIC SPEECH RECOGNITION ACOUSTIC MODELS

(75) Inventor: Jilei Tian, Tampere (FI)

(73) Assignee: Nokia Corporation, Espoo (FI)

( * ) Notice: Subject to any disclaimer, the term of this patent is extended or adjusted under 35 U.S.C. 154(b) by 668 days.

(21) Appl. No.: 12/330,921

(22) Filed: Dec. 9, 2008

(65) Prior Publication Data

US 2010/0145699 A1 Jun. 10, 2010

(51) Int. Cl.
*G10L 15/18* (2006.01)

(52) U.S. Cl. ........................................................ 704/257

(58) Field of Classification Search ................... 704/257
See application file for complete search history.

(56) References Cited

U.S. PATENT DOCUMENTS

| | | | |
|---|---|---|---|
| 7,295,982 B1 * | 11/2007 | Cohen et al. | 704/270 |
| 7,660,716 B1 * | 2/2010 | Cohen et al. | 704/249 |
| 7,698,141 B2 * | 4/2010 | Aoki et al. | 704/270 |
| 2004/0230420 A1 | 11/2004 | Kadambe et al. | |
| 2005/0182626 A1 | 8/2005 | Kim et al. | |
| 2010/0088097 A1 | 4/2010 | Tian et al. | |

FOREIGN PATENT DOCUMENTS

| | | |
|---|---|---|
| WO | 9622514 | 7/1996 |
| WO | 0014729 | 3/2000 |

OTHER PUBLICATIONS

PCT/IB2008/007650 International Search Report dated Mar. 17, 2010.

Rabiner, Lawrence R. and Juang, Biing-Hwang, Fundamentals of Speech Recognition, copyright 1993 by AT&T, published by Prentice Hall PTR Prentice Hall, Inc., Upper Saddle River, NJ.

E. Karpov et al., "Short Message Dictation on Symbian Series 60 Mobile Phones," in Proceedings of ACM 8th International Conference on Human Computer Interaction with Mobile Devices and Services, Workshop on Speech in Mobile and Pervasive Environments (SiMPE), Espoo, Finland, 2006, 5 pages.

S.J. Young et al., "Token Passing: a Simple Conceptual Model for Connected Speech Recognition Systems," Cambridge University Engineering Department, Jul. 31, 1989, pp. 1-23.

Xiaodong Cui and Abeer Alwan, "Efficient Adaptation Text Design Based on the Kullback-Leibler Measure," Dept. of Electrical Engineering, University of California, Los Angeles CA, copyright 2002 IEEE, pp. 613-616.

* cited by examiner

*Primary Examiner* — Susan McFadden
(74) *Attorney, Agent, or Firm* — Banner & Witcoff Ltd.

(57) ABSTRACT

A user terminal may determine a phoneme distribution of a text corpus, determine an acoustic model gain distribution of phonemes of an acoustic model before and after adaptation of the acoustic model, determine a desired phoneme distribution based on the phoneme distribution and the acoustic model gain distribution, generate an adaptation sentence based on the desired phoneme distribution, and generate a prompt requesting a user speak the adaptation sentence.

30 Claims, 6 Drawing Sheets

ADAPTATION OF AUTOMATIC SPEECH RECOGNITION ACOUSTIC MODELS

FIELD

Example embodiments of the invention generally relate to speech recognition. More specifically, example embodiments of the invention relate to automatic speech recognition that adapts acoustic models.

BACKGROUND

Many current automatic speech recognition (ASR) systems require a user to explicitly train acoustic models by reading predetermined sentences to adapt a speaker-independent (SI) acoustic model based on speech characteristics of the user to improve speech recognition performance.

BRIEF SUMMARY

The following presents a simplified summary of some example embodiments of the invention in order to provide a basic understanding of some example embodiments of the invention. This summary is not an extensive overview, and is not intended to identify key or critical elements or to delineate the scope of the claims. The following summary merely presents some concepts and example embodiments in a simplified form as a prelude to the more detailed description provided below.

Some example embodiments of the present disclosure are directed to an apparatus, method and system for adapting of acoustic models.

More specifically, methods, apparatus, and systems in accordance with some example embodiments of the present disclosure provide for adapting of acoustic models. A user terminal may determine a phoneme distribution of a text corpus, determine an acoustic model gain distribution of phonemes of an acoustic model before and after adaptation of the acoustic model, determine a desired phoneme distribution based on the phoneme distribution and the acoustic model gain distribution, generate an adaptation sentence based on the desired phoneme distribution, and generate a prompt requesting a user speak the adaptation sentence.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which one or more example embodiments of the invention may be practiced. It is to be understood that other embodiments may be utilized and structural and functional modifications may be made without departing from the scope of the present invention.

Figure 1:
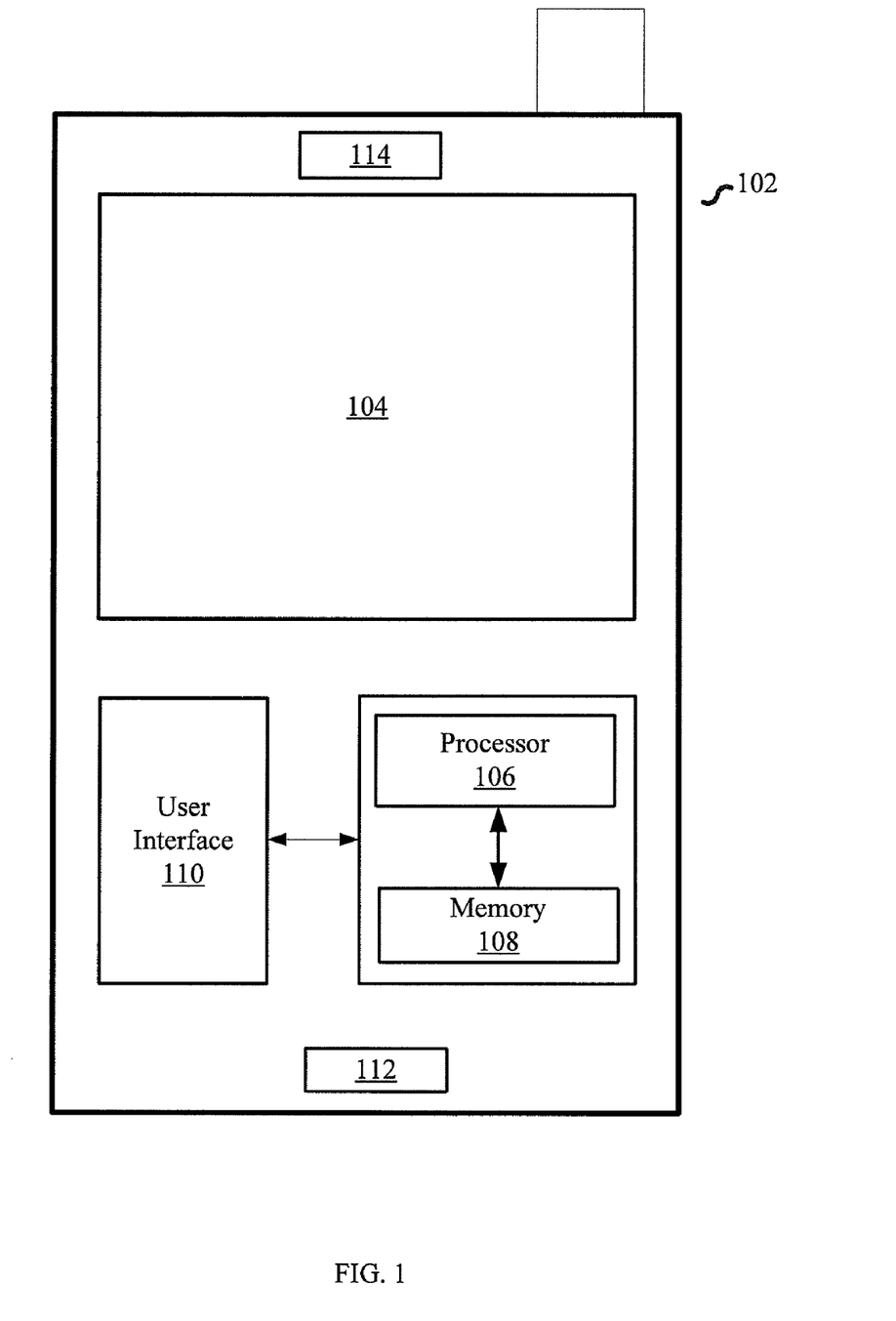
FIG. 1 illustrates a user terminal in accordance with example embodiments of the present disclosure.

FIG. 1 illustrates a user terminal in accordance with example embodiments of the present disclosure. The user terminal 102 may perform automatic speech recognition (ASR) using acoustic models, language models, and a pronunciation lexicon to recognize text from human speech via a voice interface to permit a user to provide speech input to control operations of the user terminal 102, as described in further detail below.

In an example embodiment, the user terminal 102 may be a mobile communication device, a mobile phone having an antenna, or a mobile computer, as illustrated, or may also be a digital video recorder (DVR), a set-top box (STB), a server computer, a computer, a storage device, an Internet browser device, a gaming device, an audio/video player, a digital camera/camcorder, a television, a radio broadcast receiver, a positioning device, a wired or wireless communication device, and/or any combination thereof. The user terminal 102 may be a standalone device, as depicted, or may be integrated into another device, such as, but not limited to, an automobile.

In the depicted example, the user terminal 102 includes display 104, a processor 106, memory 108 or other computer readable media and/or other storage, user interface 110, microphone 112, and a speaker 114. The microphone 112 of the user terminal 102 may receive speech input from the user, and the speaker 114 may output audio to prompt the user to interact with the voice interface. The user interface 110 may include a keypad, touch screen, voice interface, four arrow keys, joy-stick, data glove, mouse, roller ball, touch screen, or other suitable device for receiving input from a user to control the user terminal 102.

Figure 2:
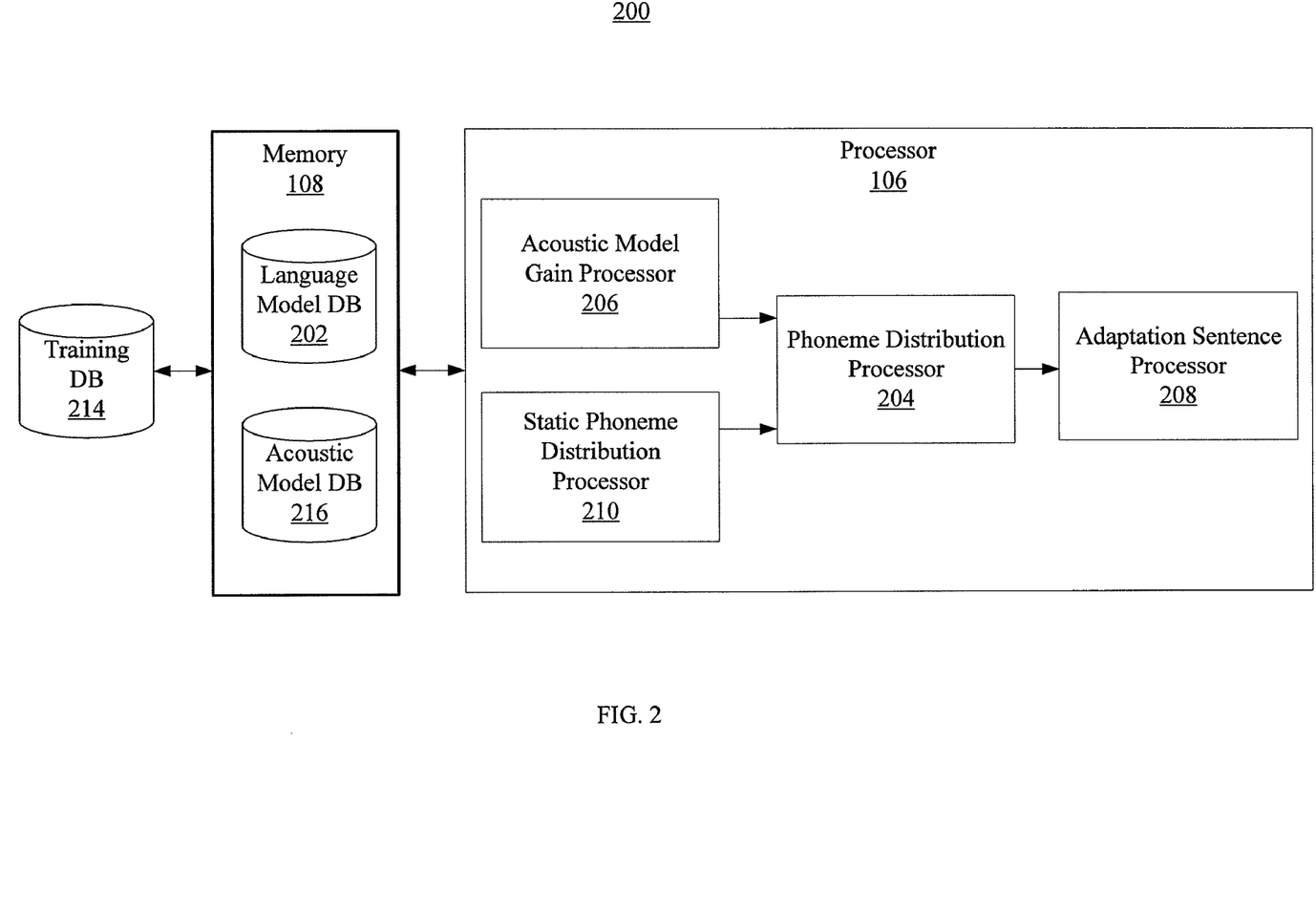
FIG. 2 illustrates an architecture of a user terminal for adapting acoustic models implemented in accordance with example embodiments of the present disclosure.

FIG. 2 illustrates an architecture 200 of the user terminal 102 for adapting acoustic models in accordance with example embodiments of the present disclosure. The processor 106 of the architecture 200 may create speaker dependent models based on adapting speaker independent models from speech input received from a speaker using efficient adaptation sentences. The architecture 200 may dynamically identify optimal adaptation sentences for the adaptation process.

In the depicted example, the architecture 200 may include a processor 106 including a phoneme distribution processor 204, an acoustic model gain processor 206, an adaptation sentence processor 208, and a static phoneme distribution processor 210. The processor 106 may be a single processor implementing the phoneme distribution processor 204, the acoustic model gain processor 206, the adaptation sentence processor 208, and the static phoneme distribution processor 210 or may be two or more separate processors remote or local to one another. The memory 108 of the architecture 200 may store data comprising a language model database 202, a training database 214, and an acoustic model database 216, which are described in further detail below with reference to FIGS. 3-5. The training database 214 also may be an input to the memory 108, as depicted.

Figure 3:
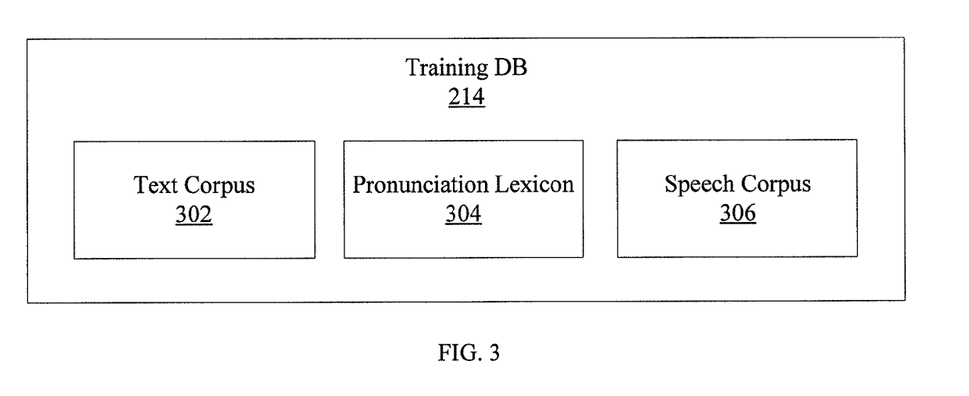
FIG. 3 illustrates a training database (DB) including a text corpus, a pronunciation lexicon, and a speech corpus in accordance with example embodiments of the present disclosure.

FIG. 3 illustrates a training database including a text corpus, a pronunciation lexicon, and a speech corpus in accordance with example embodiments of the present disclosure. A text corpus 302 may be a database that includes a structured set of text in one or more languages. The text corpus 302 may be based on excerpts from books, news, word lists, number sequences, speech dialogs between multiple people, etc. A pronunciation lexicon 304 may include a collection of words or phrases having specified pronunciations. In an example embodiment, the pronunciation lexicon may have a list of entries including a word and its pronunciation for each of the words in the text corpus 302. For example, for the word "you," the pronunciation dictionary may list the word "you" and its phoneme level pronunciation: "j u." A speech corpus 306 may be a database including speech audio files and a text transcription of each audio file. For example, the speech corpus 306 may include an audio file that is an audio recording of a person saying "How are you doing today?" and the text transcription may include text corresponding to the audio recording.

Figure 4:
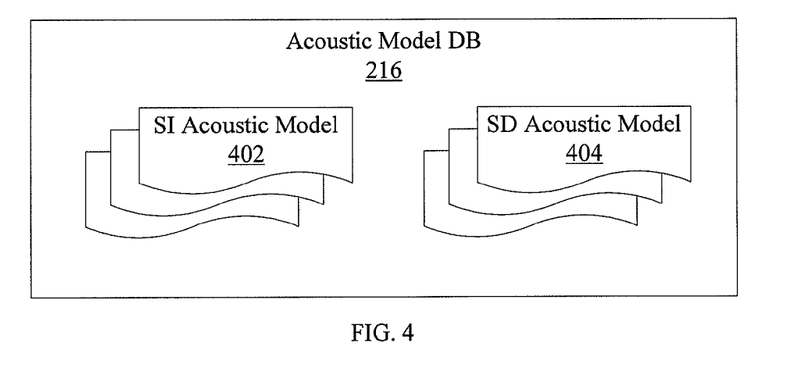
FIG. 4 illustrates an acoustic model database (DB) storing speaker independent acoustic models and speaker dependent acoustic models in accordance with example embodiments of the present disclosure.

FIG. 4 illustrates an acoustic model database storing speaker independent acoustic models and speaker dependent acoustic models in accordance with example embodiments of the present disclosure. As depicted, the acoustic model database 216 can include one or more speaker independent (SI) models 402 and one or more speaker dependent (SD) models 404. Both the SI acoustic model 402 and the SD acoustic model 404 may be trained using pre-recorded speech. In an example embodiment, the SI acoustic model 402 and the SD acoustic model 404 may be trained from the text corpus 302 and the speech corpus 306 of the training database 214. The acoustic models 402 and 404 can be, for example, context-dependent phoneme Hidden Markov Models (HMMs).

The user terminal 102 may use the acoustic models 402 and 404 to classify speech input received from a particular user to recognize spoken words in speech input. An acoustic model may include data that models different sounds, words, parts of words, and/or any combination thereof to recognize words in speech input received from a user. An acoustic model may include a statistical representation of sounds that makes up each word in the text corpus 302. In order to develop an acoustic model that can work for multiple users, an acoustic model may be trained from speech data recorded from multiple speakers and may be referred to as the SI acoustic model 402. Training of an acoustic model may refer to the process of statistically modeling of spoken words so that the text corresponding to the spoken words can be recognized by the user terminal 102.

The SI acoustic model 402, for instance, may be developed from speech input provided by multiple individuals, and thus may represent speech characteristics of an average speaker, but might not consider speaking characteristics unique to an individual speaker. The training process may generalize the SI acoustic models 402 to characterize spoken words to be recognized from a particular speaker. Because the SI acoustic model 402 is developed from multiple speakers, the SI model 402 might not have a high word recognition accuracy of speech provided by a particular speaker. The user terminal 102 may adapt the SI acoustic model 402 to improve speech recognition accuracy. The speaker adaptation solution described herein can adapt (e.g., tune) the SI acoustic model 402 with a limited speaker-specific data to better characterize the individual speaker.

Adaptation may obtain a limited amount of speech input from the particular speaker to adapt the SI acoustic model 402 to generate the SD acoustic model 404. Adaptation can be done iteratively. The SI acoustic model 402 may be adapted to generate an initial iteration of the SD acoustic model 404 by recording speech input by the particular speaker. The user can provide further input speech to continue adapting the SD acoustic model 404. For example, the particular speaker can speak one sentence for use in adapting an acoustic model. The particular speaker can provide one or more additional sentences until the adaptation session is finished. Efficient design of adaptation sentences is discussed in further detail below.

The user terminal 102 may be used as a personal device, such as, but not limited to, a mobile phone that is mostly used by a single user. When used by a single user, the user terminal 102 may include a single SD acoustic model 404 that is adapted to the speech characteristics of the single user. Also, the user terminal 102 may provide multiple SD acoustic models 404 for each user if multiple users share the user terminal 102. For example, the acoustic model may include a SD acoustic model 404 adapted to each user if the user terminal 102 is shared by multiple users.

Figure 5:
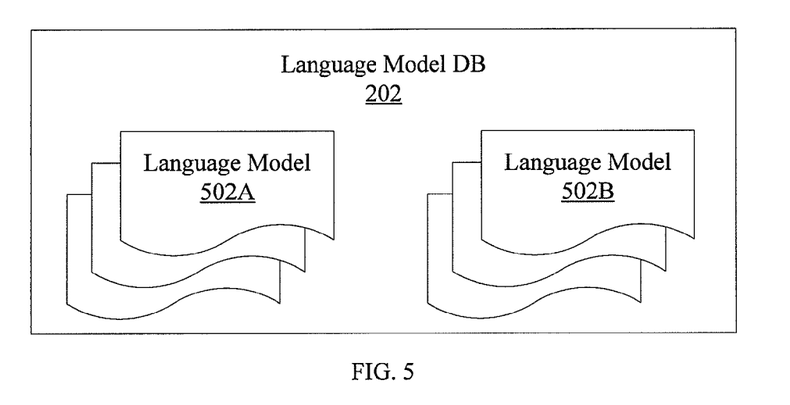
FIG. 5 illustrates a language model database (DB) storing language models in accordance with example embodiments of the present disclosure.

FIG. 5 illustrates a language model database storing in accordance with example embodiments of the present disclosure. The language model database 202 may store one or more acoustic language models such as 502A or 502B trained from the text corpus 302 and the speech corpus 306 of the training database 214. The language model 502 may be a file that assigns a probability to a word sequence and may predict a next word in a speech sequence. In an example embodiment, the language model (e.g., 502A or 502B) can be an n-gram language model. An n-gram language model may be a model that determines the probability of observing a sentence having a certain sequence of words. For example, a unigram language model may indicate a probability of how often a single word occurs in the text corpus 302, a bigram language model may indicate a probability of how often a two word sequence occurs in the text corpus 302, and an n-gram language model may indicate a probability of how often an n word sequence occurs in the text corpus 302, where n is a positive integer. In an example embodiment, language model 502A may be a unigram language model and language model 502B may be a bigram language model.

The architecture 200 may address phoneme distribution issues of the text corpus 302 to design optimal adaptation sentences for efficiently adapting the SI acoustic model 402. Speech may be broken down into phonemes, where a phoneme is a sub-word unit, but can also be other acoustic units. Examples of sub-word units are initial and final in Mandarin Chinese or a syllable. Examples of phonemes are monophone or context-dependent phone such as triphone. The phoneme distribution may measure the frequency of which each phoneme occurs in the text corpus 302. For a text corpus 302 having a limited amount of adaptation text, some phonemes may occur more frequently than others.

A limited amount of adaptation text may result in the SI acoustic model 402 having limited information on certain phonemes, and when the user speaks these phonemes, the user terminal 102 may have lower word recognition accuracy, particularly when the speech characteristics of the user differs significantly from the individuals who provided speech input to create the SI acoustic model 402. Moreover, reading pre-determined sentences, can be a time-consuming task, often is not user friendly, and may not efficiently adapt the SI acoustic model 402. To address these and other issues, the architecture 200 may process the phoneme distribution of the text corpus 302 to efficiently create adaptation sentences to achieve a desired phoneme distribution while minimizing the amount of text a user is required to speak during a supervised adaptation process.

In an example embodiment, the user terminal 102 may adapt the SI acoustic model 402 based on the speech characteristics of the user and on the background environment in which the user terminal 102 is used to generate a SD acoustic model 404. As described in further detail below, the user terminal 102 may process the SI acoustic model 402 to generate adaptation sentences that may be used to adapt the SI acoustic model 402 with a minimal amount of speech input from a user. The following describes an approach that can automatically, dynamically, and optimally generate adaptation sentences using objective function optimization of a phoneme distribution of the text corpus 302 used to train the language model (e.g., 502A) and acoustic model gain distribution to efficiently improve speech recognition accuracy and user experience.

Referring again to FIG. 2, the architecture 200 of the user terminal 102 may implement automatic speech recognition (ASR) techniques that lessen the burden on a user who may be reluctant to conduct an intensive process to adapt the SI acoustic model 402. The automatic speech recognition techniques discussed herein may be a less time-consuming task by generating optimal adaptation sentences to efficiently adapt the SI acoustic model 402.

The user may access a voice or graphical interface of the user terminal 102 to begin adapting the SI acoustic model 402. During an initial use of the interface, the user terminal 102 may perform a supervised adaptation process where the interface requests that the user speak predetermined sentences to provide speech input to adapt the SI acoustic model into a speaker-dependent (SD) acoustic model. The user terminal 102 may adapt the SI acoustic model 402 based on speech characteristics of the user and on the background environment of the user terminal 102 to develop a SD acoustic model 404 to improve word recognition accuracy. The amount of speech input used to adapt the SI acoustic model 402 may depend on the nature of the user and phoneme distribution learned from a training database 214. The user terminal 102 may, for example, tune the SI acoustic model 402 with limited user-specific speech input to adapt the acoustic model to better recognize speech provided by the user.

To begin adapting the SI acoustic model 402, the static phoneme distribution processor 210 may determine a phoneme distribution of the text corpus 302 used to train the language model such as 502A. The phoneme distribution may represent a frequency with which certain sounds occur in the text corpus 302. In an example embodiment, the static phoneme distribution processor 210 may retrieve the language model 502A and then calculate static phoneme distribution $P_G$ of the text corpus 302 based on the following equation:

$$P_G = \sum_{i=1}^{V} LM(w_i) \cdot P_w(w), \quad (1)$$

where LM may denote that the language model 502A may be a unigram language model, V may denote the number of different words in a vocabulary of the text corpus 302, $P_w$ may denote a phoneme distribution of a given ith word where i=1 to V, and $w_i$ may denote a word in a vocabulary of the text corpus 302. The vocabulary may refer to the set of words included in the text corpus 302. The phoneme distribution $P_G$ is referred to as being static because the distribution only depends on the text corpus 302 of the training database 214, and might not change over time. A phoneme distribution of a word $w_i$ is the frequency a phoneme occurs in the word $w_i$. The unigram language model LM 502A may be the frequency word $w_i$ occurs in the text corpus 302. The unigram language model LM 502A can be trained from the text corpus 302, and $P_w$ can be obtained from a pronunciation lexicon 304 having a phoneme level pronunciation for each word $w_i$ in the vocabulary of the text corpus 302. The static phoneme distribution processor 210 can uniquely determine the phoneme distribution $P_G$ for a given text corpus 302 and pronunciation lexicon 304 from Equation (1).

The acoustic model gain processor 206 may calculate an acoustic model gain distribution $G_M$ for the phonemes of an acoustic model before and after adaptation. Initially, the acoustic model gain processor 206 may process the phonemes of the SI acoustic model 402 and its first adaptation (i.e., the initial SD acoustic model 404). In subsequent calculations, the acoustic model gain processor 206 may process the phonemes of different adaptations of the SD acoustic model 404. The acoustic model gain of the phonemes may measure the similarity of the acoustic model gain distribution $G_M$ for each of the phonemes defined in an acoustic model before and after adaptation. The adaptation can be made recursively. A large acoustic model gain can indicate that an acoustic model (e.g., the SD acoustic model 404) requires more data for further adaptation, whereas a small acoustic model gain can indicate that the acoustic model is close to or has reached a stable adapted state without much more adaptation data.

In an example embodiment, the acoustic model gain processor 206 may determine a similarity measure d to compare the phonemes of acoustic models before and after adaptation. For an ith phoneme, the acoustic model before adaptation may be $\lambda_i$ and the acoustic model after adaptation may be $\lambda'_i$. The acoustic model gain processor 206 may calculate the similarity measure d between two acoustic models $\lambda_i$ and $\lambda'_i$ using Gaussian mixture density models of S states per phoneme, where each state l=1, 2, . . . S of a phoneme may be described by a mixture of N Gaussian probabilities. Each Gaussian mixture density m may have mixture weight $w_m$ and may have L component mean and standard variances $\mu_m$ and $\sigma_m$. The mixture weight $w_m$ may be a normalized weight for each mixture. The acoustic model gain processor 206 may calculate the acoustic model gain distribution $G_M$ using acoustic similarity measure d in accordance with the following equations:

$$d(\lambda_i, \lambda'_i) = \sum_{l=1}^{S} \sum_{m=1}^{N_{i,l}} w_m^{(i,l)} \cdot \min_{0 < n \leq N_{i,l}} \sum_{k=1}^{L} \left( \frac{\mu_{m,k}^{(i,l)} - \mu'^{(i,l)}_{n,k}}{\sigma_{n,k}^{(i,l)}} \right)^2 \quad (2)$$

$$G_M(\lambda_i, \lambda'_i) = \frac{d(\lambda_i, \lambda'_i) + d(\lambda'_i, \lambda_i)}{2} \quad (3)$$

Where i denotes the index of the HMM and l denotes the state of the HMM. The acoustic model gain distribution $G_M$ can represent a geometric confusion measure. The acoustic model gain distribution $G_M$ may also be closely related to a symmetricized approximation of an expected negative log-likelihood score of feature vectors emitted by one of the acoustic models on the other, where the mixture weight contribution is neglected.

The phoneme distribution processor 204 may generate a desired phoneme distribution $P_D$ based on the speaker-independent phoneme distribution $P_G$ and the acoustic model gain distribution $G_M$, which is speaker-dependent. The phoneme distribution processor 204 may then calculate the desired phoneme distribution $P_D$ based on the following equation:

$$P_D = \beta \cdot P_G + (1-\beta) \cdot G_M, \quad (4)$$

where $0 \leq \beta \leq 1$ is heuristically set as a control factor to balance between speaker-independent phoneme distribution $P_G$ and speaker-dependent acoustic model gain distribution $G_M$. When $\beta$ is close to 1, the desired phoneme distribution $P_D$ is fully dependent on the phoneme distribution $P_G$ of the SI acoustic model 402 and the supervised adaptation process is the same for every speaker and every adaptation process. When $\beta$ is close to 0, the desired phoneme distribution $P_D$ fully relies on the acoustic model gain distribution $G_M$, so the supervised adaptation process can be different for different users and for even the same user. Therefore, $\beta$ can balance between the two distributions $P_G$ and $G_M$ in order to perform more efficiently. $\beta$ may be tuned and preset when manufactured or may be adjusted based on a user setting. The adaptation sentence processor 208 may use the desired phoneme distribution $P_D$ to generate adaptation sentences.

The adaptation sentence processor 208 may use cross entropy as an objective function I for generating adaptation sentences based on the desired phoneme distribution $P_D$. Cross entropy may measure an expected logarithm of a likelihood ratio to detect similarity between two probability distributions. The adaptation sentence processor 208 may optimize the objective function I by generating and/or selecting one or more adaptation sentences having a candidate adaptation sentence phoneme distribution $P_n$ that approximates the desired phoneme distribution $P_D$ with the constraint of limiting the amount of adaptation sentences the user is asked to speak, thus improving the user experience.

In an example embodiment, the adaptation sentence processor 208 may use cross entropy as the objective function I to measure a phoneme distribution match between a desired phoneme distribution $P_D$ and a phoneme distribution $P_n$ of a candidate adaptation sentence used to approximate the desired phoneme distribution $P_D$. Also, the phoneme distribution $P_n$ may be based on multiple candidate adaptation sentences. The desired phoneme distribution $P_D$ can be considered a target distribution whereas $P_n$ may refer to the distribution of the candidate adaptation sentence used to approximate the target distribution $P_D$. The adaptation sentence processor 208 may calculate the objective function I using the following equation:

$$I(P_D, P_n) = \sum_{m=1}^{M} P_{n,m} \cdot \log \frac{P_{n,m}}{P_D} \quad (5)$$

where $P_{n,m}$ is the frequency of m-th phoneme in n-th candidate sentence and M may represent the number of phonemes. The adaptation sentence processor 208 may minimize the objective function I with respect to the desired phoneme distribution $P_D$ to identify the candidate adaptation sentence having a candidate adaptation sentence distribution $P_n$ that best approximates the desired phoneme distribution $P_D$ in a discrete probability space.

The adaptation sentence processor 208 may choose the candidate adaptation sentences by selecting one or more candidate adaptation sentences from a list of pre-defined candidate adaptation sentences, generating artificial adaptation sentences using a statistical approach, or using a combination of these approaches.

Using the sentence selection approach, the adaptation sentence processor 208 may select candidate adaptation sentences from a list of pre-defined candidate adaptation sentences in a pre-defined sentence list. The predefined sentence list may be a list of sentences created by a developer. The sentence selection approach can select natural language sentences, but may require the pre-defined sentence list with moderate efficiency. Natural language sentences may refer to sentences having a semantic meaning that a person would use in everyday conversation, as opposed to artificially generated sentences that might not have a semantic meaning. The adaptation sentence processor 208 can choose the optimal adaptation sentence from the text corpus 302 having a large number of candidate adaptation sentences by using the objection function I, discussed above. A larger number of candidate adaptation sentences may be used to improve performance, but there may be a trade-off between collection effort, the amount of memory required, and performance.

In an example embodiment, the adaptation sentence processor 208, starting from an empty candidate adaptation sentence set, may add one candidate adaptation sentence at a time to the sentence set until a number of sentences requirement is met. The number of sentences requirement may depend on adaptation efficiency or can be set as constant number, such as, but not limited to, thirty to fifty sentences. Adaptation can be terminated when adaptation results in a nominal model update of the SD acoustic model 404. The adaptation sentence processor 208 may select a candidate adaptation sentence from the list to add to the sentence set such that the sentence set with the newly added candidate adaptation sentence has a minimum cross entropy measure of the objective function I between candidate adaptation sentence phoneme distribution $P_n$ and the desired phoneme distribution $P_D$ using equation (5) above.

In addition to selecting candidate adaptation sentences from a list, the adaptation sentence processor 208 may create artificial adaptation sentences based on a statistical relationship between adjacent words and/or sounds. An artificial adaptation sentence may be an arbitrary collection of words and/or sounds that might not have a semantic meaning. The adaptation sentence processor 208 can optimize the design of the artificial adaptation sentences to improve efficiency. The design may be optimized by lessening development effort as it is not required to pre-collect adaptation sentences. The adaptation sentence processor 208 may generate the artificial sentences using a statistical approach, discussed below.

Figure 6:
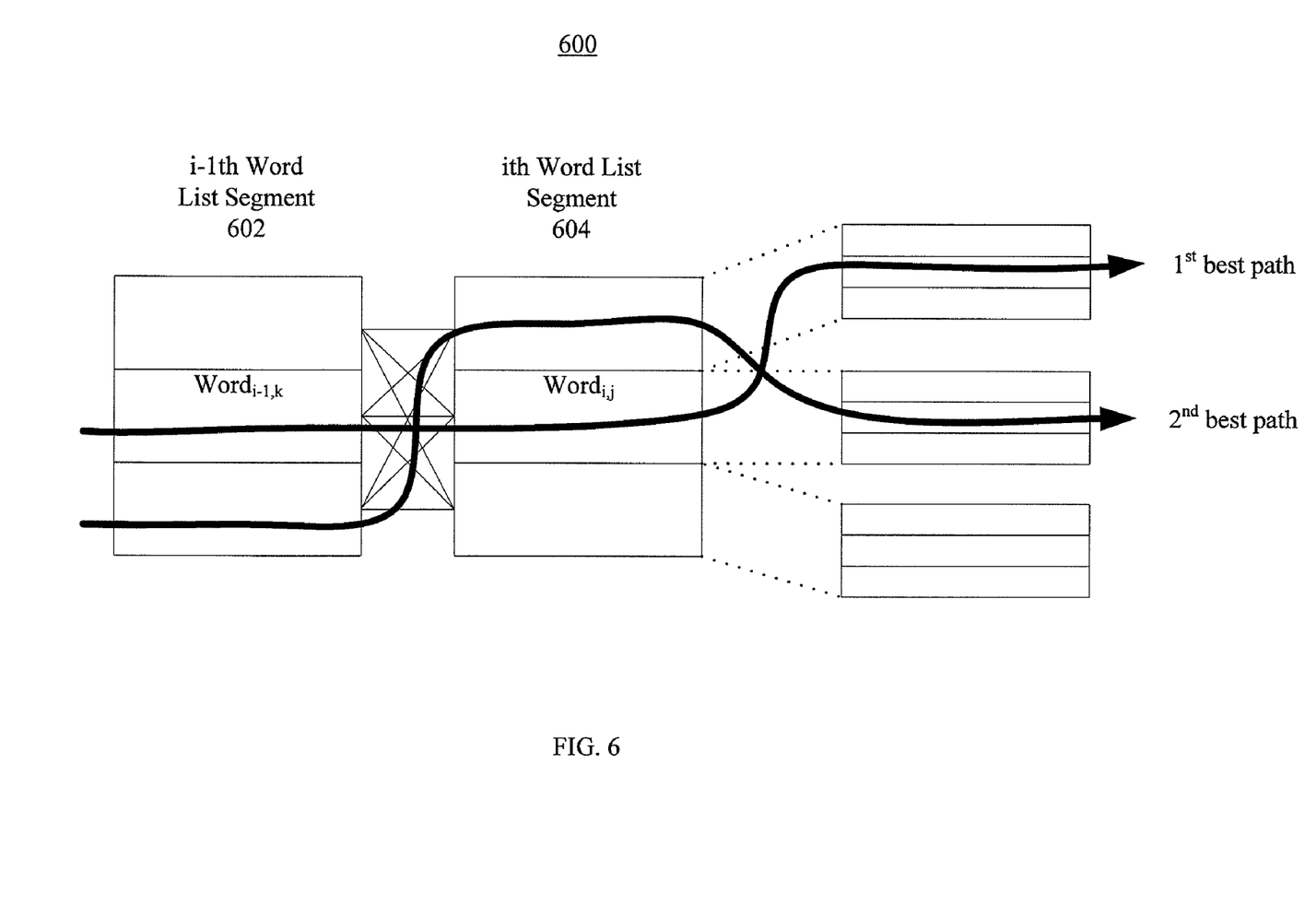
FIG. 6 illustrates a word lattice generated for a vocabulary used for generating adaptation sentences based on a statistical approach in accordance with example embodiments of the present disclosure.

FIG. 6 illustrates a word lattice generated for a vocabulary used for generating adaptation sentences based on a statistical approach in accordance with example embodiments of the present disclosure. The user terminal 102 may create a sentence having a predefined sentence length having a sequence of n words, and a word lattice 600 may be a graphical representation of a possible word sequence.

At each word segment of a sentence, the adaptation sentence processor 208 may generate a word list. The word segment may be an instance of a word in a sentence, and the word list may be a list of possible candidate words. The adaptation sentence processor 208 may determine a connection between each word in a current word list segment with each word in a preceding word list segment to identify a best path.

In an example embodiment, the adaptation sentence processor 208 may use first- and second-order n-grams, i.e. unigrams and bigrams, to identify the connection between a word in a current word list segment 604 and a word in the preceding word list segment 602. For instance, a word list may include all of the words in the text corpus 302. The adaptation sentence processor 208 may model the connection using a bigram language model $LM(word_i|word_{i-1})$ to identify the connection between words at the $(i-1)^{th}$ word list segment 602 and the $i^{th}$ word list segment 604. The bigram language model may model a word sequence based on the probability that a word is followed by another word. Token passing or A* search can be applied to find the best path to form the artificial adaptation sentence. A* search is a known best-first, graph search algorithm that can be used to find a least-cost path through the word lattice 600. Other approaches may also be used.

When using token passing, the adaptation sentence processor 208 may search the word lattice 600 for paths between words at the (i−1)th word list segment 602 to words at the ith word list segment 604 (e.g., a path between word k in the (i−1)th word list segment 602 and word j in the ith word list segment 604) that maximize an accumulative score as provided in the below equation:

$$\text{accumulative\_score}_i(word_{i,j}) = \max_{k \in Voc} \{\text{accumulative\_score}_{i-1}(word_{i-1,k}) + C \cdot LM(word_{i,j} | word_{i-1,k}) + I(P_D, P(word_{path}, word_{i,j}))\} \quad (6)$$

The accumulative score $\text{accumulative\_score}_i(word_j)$ at the ith word list segment 604 for the jth word is updated by finding the best word k of previous (i−1)th word list segment 602 that can maximize the accumulative score in Equation (6). C is an acoustic model penalty constant, and objective function I is a measure of the cross entropy between a desired phoneme distribution $P_D$ and an actual phoneme distribution from the first word in the sentence to the current word. The acoustic model penalty constant C may balance the contribution from the language model and from the acoustic model.

The adaptation sentence processor 208 may rank the paths between words in the respective word list segments based on the final accumulative score when the predefined sentence length is met. The adaptation sentence processor 208 may select the path having the highest accumulative score as the adaptation sentence. The adaptation sentence processor 208 may generate a prompt requesting that the user speak the adaptation sentence to provide speech input for adapting the SD acoustic model 404 to generate an update of the SD acoustic model 404 by updating the statistical representations of the phonemes based on the user speaking the adaptation sentence.

The artificial adaptation sentence approach described above can efficiently generate optimal adaptation sentences, but the optimal adaptation sentence may be a meaningless collection of words as they are created to provide a desired collection of sounds rather than to provide a semantic meaning. As the adaptation sentences can be used for adaptation of acoustic models, the semantic meaning of the sentences may not always be important. The adaptation sentence processor 208 may, however, implement a syntactic structure to provide the generated artificial adaptation sentences with a reasonable semantic meaning. To improve the semantic meaning of the adaptation sentences, the adaptation sentence processor 208 may use finite state grammar (FSG) and a class-based language model. The FSG may represent a structure of multiple classes in a language model. The adaptation sentence processor 208 may use the structure of the FSG to provide structure to a generated adaptation sentence such that the artificial adaptation sentence provides words that complete classes in the language model. For example, the class-based language model may be:

$Person_Name_Class; e.g., John, Smith,
$Location_Name_Class; e.g., Boston, Paris, Helsinki,
$Natural_Number_Class; e.g., Twenty one,
$Digit_Class; e.g., two one,
$Time_Class; e.g., 2:30,
$Date_Class; e.g., 30 Jul. 2008.

The FSG may be:

FSG: Sentence-Start $Person_Name_Class makes a flight reservation from $Location_Name_Class to $Location_Name_Class at $Time_Class on $Date_Class Sentence-End.

The adaptation sentence processor 208 can generate an artificial adaptation sentence using the methods mentioned above to identify words to complete the artificial adaptation sentence using the structure of the FSG (e.g., John makes a flight reservation from Boston to Helsinki at 2:30 on 30 Jul. 2008). Due to the structure constraint of the FSG, the adaptation sentence processor 208 can generate artificial adaptation sentences having a semantic meaning. Once the optimal adaptation sentence has been identified, either through selection from a list or by artificial creation, the adaptation sentence processor 208 may generate a prompt requesting the user speak the adaptation sentence to provide speech input for adapting the SD acoustic model 404 to generate an update of the SD acoustic model 404 by updating the statistical representations of the phonemes based on the user speaking the adaptation sentence.

After the SD acoustic model 404 has been adapted by using the adaptation sentence, the acoustic model gain processor 206 may determine a similarity measure d for the updated SD acoustic model 404 to generate an update of the acoustic model gain distribution $G_M$ using equations (2) and (3) discussed above. The acoustic model gain processor 206 may then use the updated acoustic model gain distribution $G_M$ to determine whether to further adapt the desired phoneme distribution $P_D$. For instance, a large acoustic model gain distribution $G_M$ can indicate that the SD acoustic model 404 requires further adaptation, whereas a small acoustic model gain distribution $G_M$ can indicate that the SD acoustic model 404 is close to or has reached a stable adapted state without much more adaptation.

If the acoustic model gain distribution $G_M$ is sufficiently small, the acoustic model gain processor 206 may determine not to further adapt the SD acoustic model 404. The voice interface of the user terminal 102 may output audio to inform the user that the supervised adaptation process has been completed.

If the acoustic model gain distribution $G_M$ is not sufficiently small, the acoustic model gain processor 206 may determine to further adapt the SD acoustic model 404. The phoneme distribution processor 204 may use the updated acoustic model gain distribution $G_M$ and the phoneme distribution $P_G$ to update the desired phoneme distribution $P_D$ using equation (4) above. The phoneme distribution processor 204 may communicate the updated desired phoneme distribution $P_D$ to the adaptation sentence processor 208 to design another adaptation sentence using the candidate adaptation sentence selection approach and/or the artificial adaptation sentence generation approach discussed above. The updates of the acoustic model may continue until the acoustic model gain distribution $G_M$ is sufficiently small.

Figure 7:
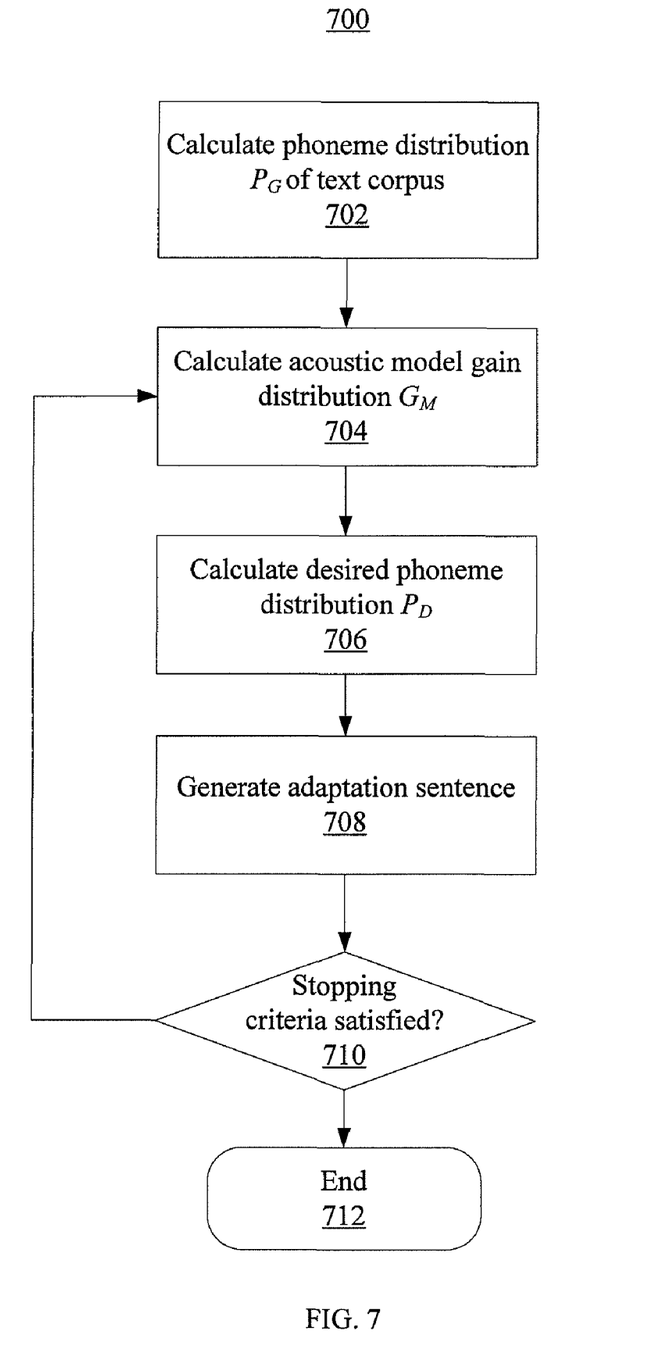
FIG. 7 illustrates a method for selecting optimal adaptation sentences to adapt an acoustic model in accordance with example embodiments of the present disclosure.

FIG. 7 illustrates a method for selecting optimal adaptation sentences to adapt an acoustic model in accordance with example embodiments of the present disclosure. The method 700 may began in block 702.

In block 702, the static phoneme distribution processor 210 of the user terminal 102 may calculate a phoneme distribution $P_G$. The static phoneme distribution processor 210 may determine a phoneme distribution of a text corpus 302 used to train the language model 502A. The phoneme distribution may represent a frequency with which certain sounds occur in the text corpus 302 used to train the language model 502A. In an example embodiment, the static phoneme distribution processor 210 may retrieve the language model 502A and then calculate the phoneme distribution $P_G$ for the text corpus 302 and the pronunciation lexicon 304 from Equation (1).

In block 704, the acoustic model gain processor 206 may calculate an acoustic model gain distribution $G_M$ of the phonemes of the acoustic model before and after adaptation. In the initial pass through block 704, the acoustic model gain processor 206 may determine the acoustic model gain distribution $G_M$ of the phonemes the SI acoustic model 402 and its first adaptation (i.e., the initial SD acoustic model 404), and in subsequent calculations, the acoustic model gain processor 206 may process the phonemes of different adaptations of the SD acoustic model 404, using equations (2) and (3) above.

In block 706, the phoneme distribution processor 204 may calculate a desired phoneme distribution $P_D$. The phoneme distribution processor 204 may combine the acoustic model gain distribution $G_M$ with the phoneme distribution $P_G$ to determine the desired phoneme distribution $P_D$ using equation (4) above.

In block 708, the adaptation sentence processor 208 may generate an adaptation sentence based on the desired phoneme distribution $P_D$. The adaptation sentence processor 208 may select an adaptation sentence having a phoneme distribution $P_n$ that best matches the desired phoneme distribution $P_D$. In an example embodiment, the adaptation sentence processor 208 may determine candidate adaptation sentence phoneme distributions $P_n$ of multiple candidate adaptation sentences in a pre-defined sentence list, and may identify a candidate adaptation sentence of the candidate adaptation sentences that has a minimal cross entropy measure (i.e., the candidate adaptation sentence having a phoneme distribution $P_n$ that best approximates the desired phoneme distribution $P_D$) with the desired phoneme distribution $P_D$ based on objection function I of equation (5). Also, the adaptation sentence processor 208 can automatically generate artificial adaptation sentences using the approach described above. The user terminal 102 may then generate a prompt requesting the user speak the adaptation sentence to adapt the SD acoustic model 404 by updating statistical representations of the phonemes of the SD acoustic model 404 from the speech input of the user speaking the adaptation sentence.

In block 710, the acoustic model gain processor 206 may determine whether a stopping criteria has been satisfied. The stopping criteria may be based on a value of the acoustic model gain distribution $G_M$, as discussed above. If the stopping criteria is not satisfied, the method 700 may return to block 704 to further adapt the acoustic model. If the stopping criteria has been satisfied, the method may continue to block 712 and end.

Figure 8:
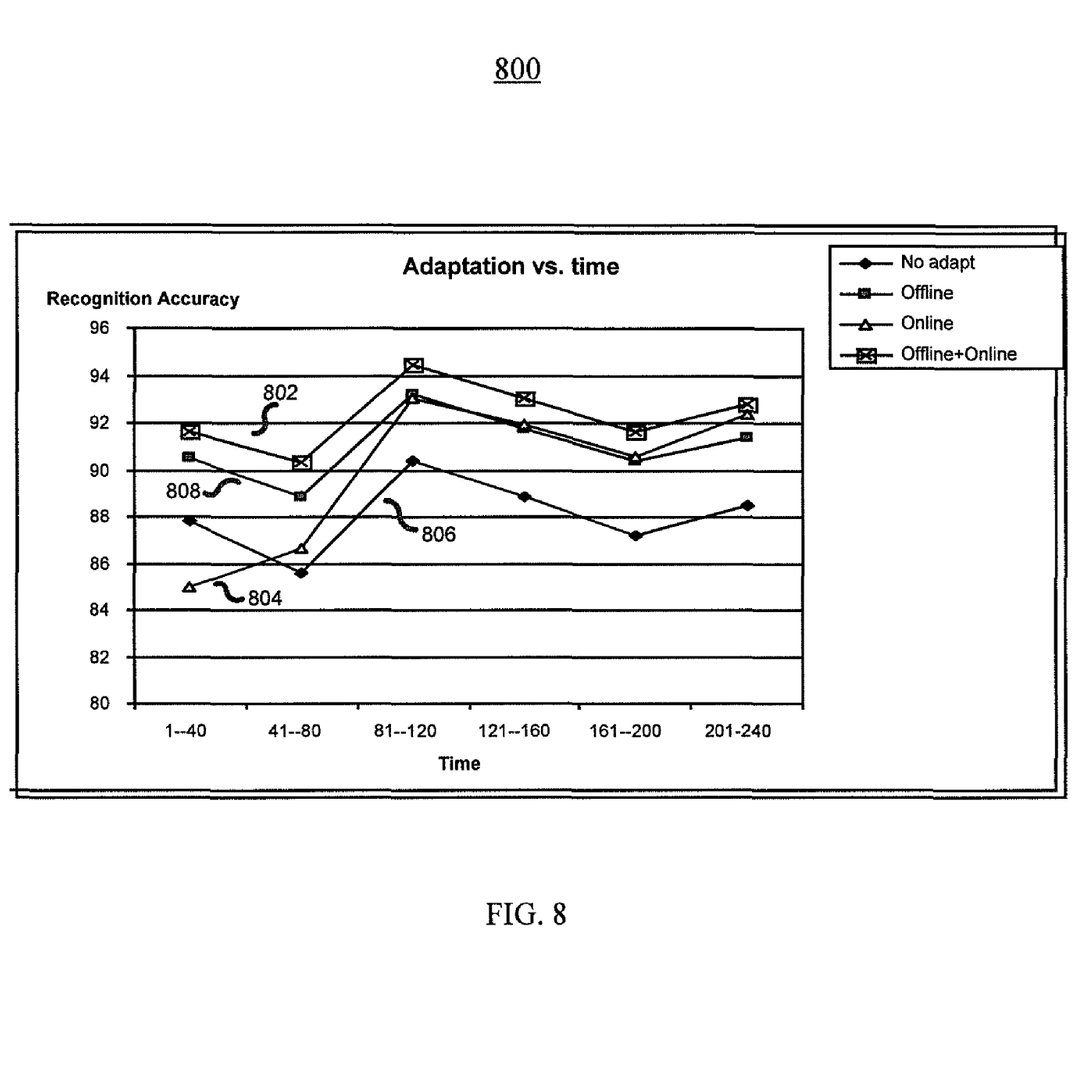
FIG. 8 illustrates a chart depicting word recognition performance for different adaptation techniques in accordance with example embodiments of the present disclosure.

FIG. 8 illustrates a chart depicting word recognition performance for different adaptation techniques in accordance with example embodiments of the present disclosure. The chart 800 illustrates a relationship between amounts of adaptation versus time for different adaptation techniques to depict how recognition accuracy varies over time. As depicted, there are four different lines 802-808 representing recognition accuracy by line 806 where there is no adaptation, line 808 where there is off-line adaptation, line 802 where there is both off-line and on-line adaptation, and line 804 where there is on-line adaptation and no off-line adaptation. Off-line adaptation refers to the supervised adaptation process discussed above. Online adaptation refers to adaptation process as the user terminal 102 adapts the SD acoustic model 404 over time based on feedback received from the user when using the voice interface. For instance, given a user's speech, the user terminal 102 can decode the speech into text and use the recognized text for further adaptation of the SD acoustic model 404. In this example, the adaptation sentence processor 208 may use acoustic Bayesian adaptation. The text set used in the experiments contains a total of 5500 Short Message Service (SMS) messages from 23 U.S. English speakers, male and female, where each speaker provided 240 utterances. During supervised adaptation, the acoustic model provides that each person speaks thirty enrollment utterances.

As shown in FIG. 8, offline supervised adaptation (see line 808) offers significant improvement due to reliable supervised data and phonetically rich transcription. Combined offline supervised and online unsupervised adaptation (see line 802) brings the best performance. Thus, supervised adaptation brings the best recognition performance especially during initial use of the voice interface.

The automatic speech recognition (ASR) techniques as described herein may overcome challenges with devices having a limited interface, such as in mobile environments. The automatic speech recognition (ASR) technology may provide an improved user interface, especially for mobile devices due to their limited keypad.

The ASR techniques described above may be used to replace preselected adaptation sentences in a SI acoustic model with new adaptation sentences to adapt the SI acoustic model with less speech input from a user. For instance, a SI acoustic model may have preselected adaptation sentences that have an unbalanced phoneme distribution, and hence using the preselected adaptation sentences may not effectively adapt the acoustic model. Therefore, for supervised speaker adaptation of acoustic models, the ASR techniques described above may efficiently design optimal adaptation sentence to provide optimal word recognition performance while minimizing the amount of text a user is required to speak to adapt the acoustic model.

Computer executable instructions and data used by processor 106 and other components within user terminal 102 may be stored in the memory 108 in order to carry out any of the method steps and functions described herein. The memory 108 may be implemented with any combination of read only memory modules or random access memory modules, optionally including both volatile and nonvolatile memory. Also, some or all of user terminal 102 computer executable instructions may be embodied in hardware or firmware (not shown).

Although only a single instance of each device is depicted in FIG. 1, the user terminal 102 may include one or more of each of these devices. Moreover, the functions performed by each of the devices illustrated in FIG. 1 may be split into additional devices or the illustrated devices may be combined with one another. Further, the user terminal 102 may also be included in other systems (not shown) or may include additional devices. For instance, the user terminal 102 may be integrated into an automobile.

The foregoing description was provided with respect to adapting acoustic models to provide a voice interface having improved recognition accuracy. It is understood that the principles described herein may be extended to other automatic speech recognition technologies. Moreover, the description above describes certain components and functions being performed by certain devices in various example embodiments. The components and functions of the various example embodiments may be combined with and/or separated from one another.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining a phoneme distribution of a text corpus;
   determining an acoustic model gain distribution of phonemes of an acoustic model before and after adaptation of the acoustic model;
   determining, by a processor, a desired phoneme distribution based on the phoneme distribution and the acoustic model gain distribution;
   generating an adaptation sentence based on the desired phoneme distribution; and
   generating a prompt requesting a user speak the adaptation sentence.

2. The method of claim 1, further comprising adapting the acoustic model to generate an updated acoustic model based on updating statistical representations of the phonemes from speech input of the user speaking the adaptation sentence.

3. The method of claim 2, further comprising determining an updated acoustic model gain distribution based on the phonemes of the acoustic model and phonemes of the updated acoustic model.

4. The method of claim 3, further comprising determining that a similarity measure based on the updated acoustic model gain distribution satisfies a stopping criterion to end adaptation of the updated acoustic model.

5. The method of claim 1, wherein the acoustic model gain distribution is a similarity measure that measures similarity between the phonemes of the acoustic model before and after adaptation.

6. The method of claim 1, wherein the generation of the adaptation sentence comprises selecting a candidate adaptation sentence from a list of candidate adaptation sentences as the adaptation sentence.

7. The method of claim 1, wherein the generation of the adaptation sentence further comprises:
   determining a plurality of candidate adaptation sentence phoneme distributions of a plurality of candidate adaptation sentences;
   identifying a first candidate adaptation sentence of the plurality of candidate adaptation sentences that has a minimal cross entropy measure with the desired phoneme distribution; and
   selecting the first candidate adaptation sentence as the adaptation sentence.

8. The method of claim 1, wherein the generation of the adaptation sentence further comprises identifying a word path that optimizes an accumulative score through a plurality of word list segments of a vocabulary.

9. The method of claim 1, wherein the generation of the adaptation sentence comprises modeling connections between words in successive word lists of a vocabulary as a bigram to determine a relationship between the words.

10. The method of claim 1, wherein the generation of the adaptation sentence comprises applying a finite state grammar to provide structure to the adaptation sentence.

11. The method of claim 1, wherein the phoneme distribution is calculated using a unigram language model.

12. An apparatus comprising:
   a processor; and
   a memory coupled to the processor and storing computer readable instructions, the memory and the instructions configured to, with the processor, cause the apparatus at least to:
   determine a phoneme distribution of a text corpus;
   determine an acoustic model gain distribution of phonemes of an acoustic model before and after adaptation of the acoustic model;
   determine a desired phoneme distribution based on the phoneme distribution and the acoustic model gain distribution;
   generate an adaptation sentence based on the desired phoneme distribution; and
   generate a prompt requesting a user speak the adaptation sentence.

13. The apparatus of claim 12, wherein the computer readable instructions, when executed, cause the apparatus to adapt the acoustic model to generate an updated acoustic model based on updating statistical representations of the phonemes from speech input of the user speaking the adaptation sentence.

14. The apparatus of claim 13, wherein the computer readable instructions, when executed, cause the apparatus to determine an updated acoustic model gain distribution based on the phonemes of the acoustic model and phonemes of the updated acoustic model.

15. The apparatus of claim 14, wherein the computer readable instructions, when executed, cause the apparatus to determine that a similarity measure based on the updated acoustic model gain distribution satisfies a stopping criterion to end adaptation of the updated acoustic model.

16. The apparatus of claim 12, wherein the computer readable instructions, when executed, cause the apparatus to select a candidate adaptation sentence from a list of candidate adaptation sentences as the adaptation sentence.

17. The apparatus of claim 12, wherein the computer readable instructions for the generation of the adaptation sentence, when executed, cause the apparatus to:
   determine a plurality of candidate adaptation sentence phoneme distributions of a plurality of candidate adaptation sentences;
   identify a first candidate adaptation sentence of the plurality of candidate adaptation sentences that has a minimal cross entropy measure with the desired phoneme distribution; and
   select the first candidate adaptation sentence as the adaptation sentence.

18. The apparatus of claim 12, wherein the computer readable instructions, when executed, cause the apparatus to identify a word path that optimizes an accumulative score through a plurality of word list segments of a vocabulary.

19. The apparatus of claim 12, wherein the computer readable instructions, when executed, cause the apparatus to model connections between words in successive word lists of a vocabulary as a bigram to determine a relationship between the words.

20. The apparatus of claim 12, wherein the computer readable instructions, when executed, cause the apparatus to apply a finite state grammar to provide structure to the adaptation sentence.

21. One or more non-transitory computer readable media storing computer-executable instructions which, when executed by a processor, cause an apparatus at least to:
  determine a phoneme distribution of a text corpus;
  determine an acoustic model gain distribution of phonemes of an acoustic model before and after adaptation of the acoustic model;
  determine a desired phoneme distribution based on the phoneme distribution and the acoustic model gain distribution;
  generate an adaptation sentence based on the desired phoneme distribution; and
  generate a prompt requesting a user speak the adaptation sentence.

22. The one or more computer readable media of claim 21, storing further computer-executable instructions which, when executed, cause the apparatus to adapt the acoustic model to generate an updated acoustic model based on updating statistical representations of the phonemes from speech input of the user speaking the adaptation sentence.

23. The one or more computer readable media of claim 22, storing further computer-executable instructions which, when executed, cause the apparatus to determine an updated acoustic model gain distribution based on the phonemes of the acoustic model and phonemes of the updated acoustic model.

24. The one or more computer readable media of claim 23, storing further computer-executable instructions which, when executed, cause the apparatus to determine that a similarity measure based on the updated acoustic model gain distribution satisfies a stopping criterion to end adaptation of the updated acoustic model.

25. The one or more computer readable media of claim 21, storing further computer-executable instructions which, when executed, cause the apparatus to select a candidate adaptation sentence from a list of candidate adaptation sentences as the adaptation sentence.

26. The one or more computer readable media of claim 21, storing further computer-executable instructions, for the generation of the adaptation sentence, that, when executed, cause the apparatus to:
  determine a plurality of candidate adaptation sentence phoneme distributions of a plurality of candidate adaptation sentences;
  identify a first candidate adaptation sentence of the plurality of candidate adaptation sentences that has a minimal cross entropy measure with the desired phoneme distribution; and
  select the first candidate adaptation sentence as the adaptation sentence.

27. The one or more computer readable media of claim 21, storing further computer-executable instructions which, when executed, cause the apparatus to identify a word path that optimizes an accumulative score through a plurality of word list segments of a vocabulary.

28. The one or more computer readable media of claim 21, storing further computer-executable instructions which, when executed, cause the apparatus to model connections between words in successive word lists of a vocabulary as a bigram to determine a relationship between the words.

29. The one or more computer readable media of claim 21, storing further computer-executable instructions which, when executed, cause the apparatus to apply a finite state grammar to provide structure to the adaptation sentence.

30. An apparatus comprising:
  means for determining a phoneme distribution of a text corpus;
  means for determining an acoustic model gain distribution of phonemes of an acoustic model before and after adaptation of the acoustic model;
  a processor configured for determining a desired phoneme distribution based on the phoneme distribution and the acoustic model gain distribution;
  means for generating an adaptation sentence based on the desired phoneme distribution; and
  means for generating a prompt requesting a user speak the adaptation sentence.

* * * * *